United States Patent [19]

Steinbichler

[11] Patent Number: 5,289,264
[45] Date of Patent: Feb. 22, 1994

[54] METHOD AND APPARATUS FOR ASCERTAINING THE ABSOLUTE COORDINATES OF AN OBJECT

[76] Inventor: Hans Steinbichler, Am Bauhof 4, 8201 Neubeuern, Fed. Rep. of Germany

[21] Appl. No.: 950,679

[22] Filed: Sep. 25, 1992

[30] Foreign Application Priority Data

Sep. 26, 1991 [DE] Fed. Rep. of Germany ....... 4132134
Oct. 18, 1991 [DE] Fed. Rep. of Germany ....... 4134546

[51] Int. Cl.$^5$ .............................................. G01B 11/24
[52] U.S. Cl. .................................................... 356/376
[58] Field of Search ............................... 356/375, 376; 250/237 G

[56] References Cited

U.S. PATENT DOCUMENTS

| | | | |
|---|---|---|---|
| 4,212,073 | 7/1980 | Balasubramanian | 356/376 |
| 4,349,277 | 9/1982 | Mundy et al. | 250/237 G |
| 4,564,295 | 1/1986 | Halioua | 356/376 |
| 4,641,972 | 2/1987 | Halioua et al. | 356/376 |
| 4,657,394 | 4/1987 | Halioua | 250/237 G |
| 4,802,759 | 2/1989 | Matsumoto et al. | 356/376 |
| 4,939,380 | 7/1990 | Berger et al. | 250/578.1 |
| 5,135,308 | 8/1992 | Kuchel | 356/376 |

FOREIGN PATENT DOCUMENTS

0181553 5/1986 European Pat. Off. .
0182469 5/1986 European Pat. Off. .
0343366 11/1989 Fed. Rep. of Germany .

Primary Examiner—Richard A. Rosenberger
Attorney, Agent, or Firm—Morgan & Finnegan

[57] ABSTRACT

An apparatus is used for ascertaining the absolute coordinates of an object (1). Said apparatus includes a light source (6), projection optics, in particular a projection objective (7), a projection grating (2) which is projected onto the object (1) through the projection optics (7) to form an image, a sensor (5) for receiving the light (4) reflected from the object (1), and an objective (8) projecting the light (4) reflected from the object (1) onto the sensor (5). In order to enable the simple determination of the absolute coordinates of the object (1), the projection grating (2) and/or the sensor (5) are rotatable. There is provided an evaluation unit which evaluates the signals (shots or pictures) of the sensor (5) at least two different angle positions of the projection grating (2) or of the sensor (5) and determines the absolute coordinates of the object (1) therefrom.

26 Claims, 1 Drawing Sheet

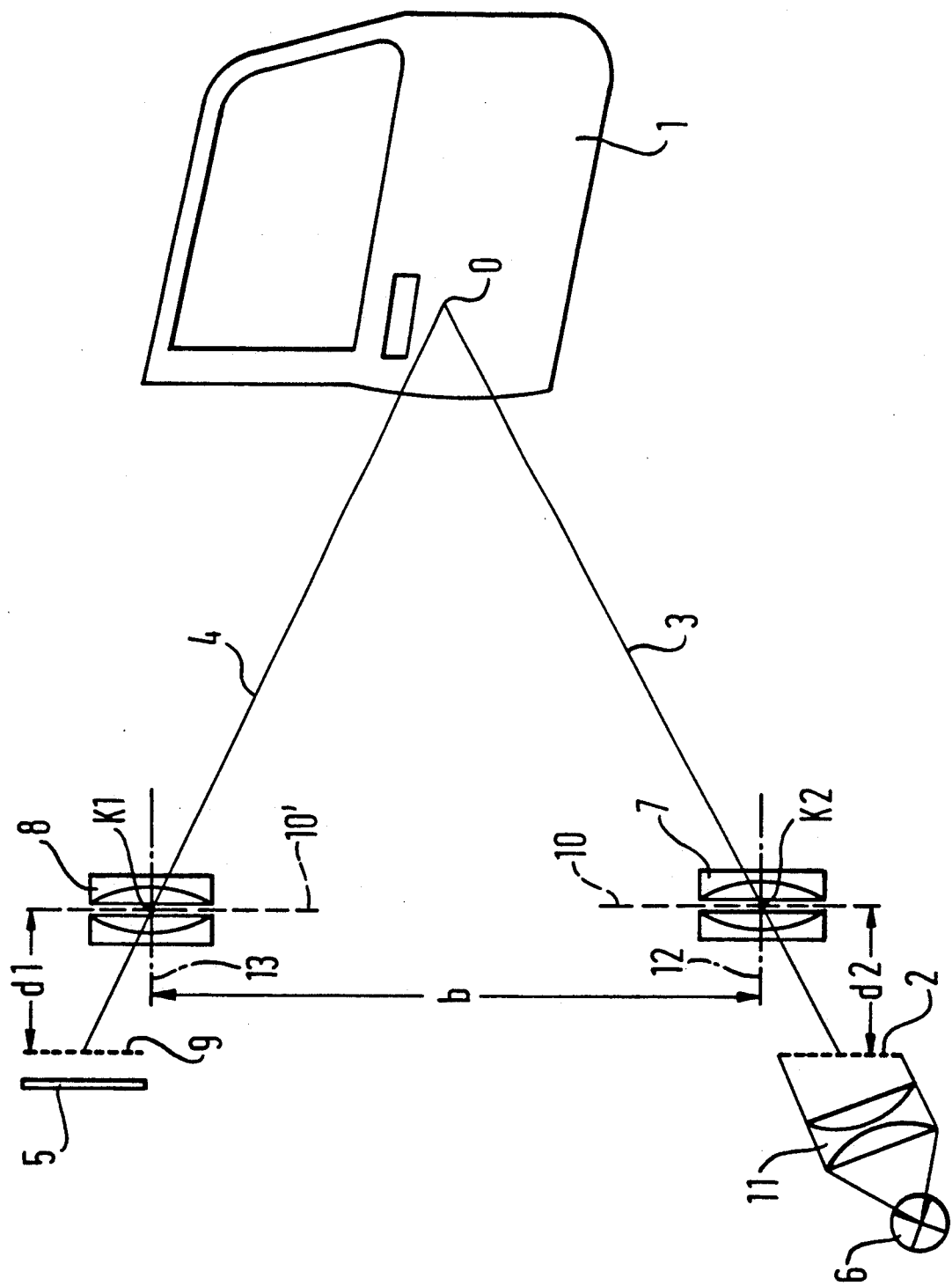

METHOD AND APPARATUS FOR ASCERTAINING THE ABSOLUTE COORDINATES OF AN OBJECT

BACKGROUND OF THE INVENTION

1. Field of the Invention

This invention refers to a method for ascertaining the absolute coordinates of an object, wherein light is directed onto the object through a projection grating and wherein the light reflected from the object is received by a sensor and the signal (shot or picture) of the sensor is evaluated. The invention also refers to an apparatus for performing such a method, i.e. to an apparatus for the determination of the absolute coordinates of an object, consisting of a light source, projection optics, in particular a projection objective (lens), a projection grating which is projected onto the object by means of the projection optics to form an image, a sensor for receiving the light reflected from the object and an objective directing the light reflected from the object onto the sensor to form an image.

2. Description of the Prior Art

By means of the Moiré technique and with projected lines the three-dimensional geometry of the surface of an object can be ascertained. This has been described in Takasaki, H.: Moiré Topography, Applied Optics, Vol. 9, No. 6, 1970, p. 1457–1472, to which reference is made.

The evaluation of the contour line images is carried out by a computer for instance with the so-called phase shift method described in e.g. Dändliker R., Tahlmann R., Willemin J. F. : Fringe Interpretation by Two-Reference-Beam Holographic Interferography: Reducing Sensitivity to Hologram Misalignment, Oct. Comm. 41.301 (1982), and in B. Breuckmann, "Ein Gerätesystem for die rechnergestützte optische Meβtechnik" (an apparatus system for the computer-aided optical measuring technique), VDI-Reports 617, Laser Measuring Technique, p. 245–254, to which reference is made. In said phase shift method, images displaced in phase (sensor shots or pictures) are read into the computer successively via a video camera. It is also possible to process the contour line images by means of a Fourier evaluation. With respect to the Fourier evaluation see Th. Kreis, K. Roesener, W. Jüptner/D: Holografisch interferometrische Verformungsmessung mit dem Fourier-Transformations-Verfahren (holographic interferometric deformation measurement by using the Fourier transformation method), Laser 87, Optoelektronics in Technology, edited by Springer Verlag, to which reference is made. Furthermore, the evaluation can also be performed using other techniques which only require one contour line image (sensor shot or picture, or video image). Such techniques are described for instance in the German Patent Specification 39 07 430 and in the German Patent Specification 38 43 396 to the contents of which it is also referred.

By the Moiré technique the relative form of the surface of the object can be obtained, but in general the absolute distance between the sensor (camera) and the object cannot be ascertained from a contour line image by using said technique. And it is also impossible to determine the absolute coordinates of the surface of the object by the above-mentioned techniques and methods known per se.

However, the absolute coordinates of the object are required for ascertaining the absolute size of the object or the depth of the object when there are step-like cross-sections. Since there is not included any information on the image scale in the contour line image, for the determination of the absolute coordinates additional data are required apart from the contour line image. Said data are gained in known methods by means of distance sensors or by changing the contour line distance or by moving the object or the camera. But for that purpose masses must be moved, which requires a stable structure of the test station and is relatively time-consuming. When a certain degree of precision is to be achieved, the mechanical expenditure is very high. A method and an apparatus for the quantitative absolute measurement of the three-dimensional coordinates of a test object by means of the Moiré method is known from the older but not yet published German patent application P 40 11 406.6. With the method described therein a displacement means for displacing and measuring the displacement path of a calibration body and/or of the test object is provided normal to the plane of the gratings (projection grating and reference grating). Reference is made to said patent application P 40 11 406.6.

From the U.S. Pat. Specification 4,802,759, a method for ascertaining the coordinates of a point of an object is known, in which light is directed through the projection grating which is projected onto the object. The pattern created on the object as an image of the protection grating is projected onto a flat and locally resolving sensor for the formation of an image. The coordinates of a point of the object are determined by triangulation of the point from the projection grating and from the sensor. But only one single sensor image is taken. For the performance of the known method is is necessary to identify a reference line.

U.S. Pat. Specification 4,564,295 discloses a method wherein a grating is projected onto the object. Then an image is formed of the object which is covered by a reference grating (Moiré). For the evaluation, the reference grating is moved or the projection grating and the reference grating are moved in synchronism. Said synchronous movement of the gratings causes stationary contour lines on the object.

From the U.S. Pat. Specification 4,641,972 a method is known in which a sinusoidal grating is projected onto the object and the object is observed at an angle. The evaluation is performed by means of the phase shift technology. An evaluation by means of a triangulation is not carried out.

U.S. Pat. Specification 4,349,27 discloses a method in which colored gratings with at least two different wave lengths are projected onto the object. The taking of the image is carried out via color separating filters for the wave length selection on two diode arrays. Equidistant gratings in different colors which are displaced with respect to each other are projected in parallel. The evaluation is performed through the ratio of the intensities of the respective colors.

SUMMARY OF THE INVENTION

On the basis thereof, it is an object of the invention to provide that by a method of the kind mentioned hereinbefore the absolute coordinates of the object are ascertained in a simple manner. Furthermore, the object of the invention lies in the creation of an apparatus of the kind mentioned above by which the absolute coordinates of the object can be ascertained in an easy manner.

For a method of the kind mentioned hereinabove, said problem is solved by the fact that at a first position of the projection grating (e.g. bar grating or grid) and of the sensor a first picture-taking and evaluation is carried out, that then the projection grating may be rotated about an axis perpendicular to the grating plane through a certain angle, and that a second picture-taking and evaluation of the sensor is carried out, and that on the basis of said evaluations the absolute coordinates of the object may be ascertained. Additionally, for increasing the accuracy the sensor can be moved. Thereby a resolution below one picture element (pixel) can be obtained.

With the method according to the invention the absolute coordinates of the object are ascertained from a measurement and a computation. The absolute coordinates of those points of the object are determined which reflect the light projected onto the object. In general, these points are at the surface of the object, but they can also be points in the interior of the object when the object is at least partially transparent. Also transparent objects (phase objects) can be transilluminated in order to determine refractive indices (density of the transparent medium). Any kind of light can be directed onto the object, preferably white light. But it is also possible to use coherent light, e.g. laser light. The projection grating can be sinusoidal, ramp-like or rectangular or of any other form. The projection grating can be projected onto the object or its surface by means of a projection optics. Any optical system can be used as projection optics which forms the image of the projection grating on the object, preferably a projection objective, but e.g. also a Michelson interferometer.

The sensor which receives the light reflected from the object or its surface is a plane, locally resolving sensor (planar sensor), e.g. a CCD sensor (charge coupled device) or a video camera. It can receive the light reflected from the object or its surface through an objective. The signal (shot or picture) of the sensor is then evaluated by means of a method known per se, for instance by using a phase shift method, a Fourier transformation or by means of the method according to the German Patent Specification 38 43 396.

The ascertaining of the absolute coordinates of the object is performed according to the principle of triangulation (trigonometry). In order to ascertain the absolute coordinates of an object point, the triangle, consisting of projection grating point, sensor point and object point, is determined. The sensor point is known from the individual illuminated pixel (picture element) of the sensor. From the geometric structure of the optical system also the angle from the sensor point to the object point is known. Consequently, the pertaining grating point (point on the projection grating) as well as the angle belonging to said grating point and formed with the object point must still be determined.

To this end, two sensor shots or pictures with different grating angles are evaluated. This allows the determination of the grating point and of the angle from the grating point to the object point. Thereby, in turn, the absolute coordinates of the object point can be ascertained. The intensity on each pixel of the sensor is used as measurement quantity for the evaluation of the sensor.

It is preferred that the grating (and not the sensor) is rotated through a predetermined angle. The grating is rotated about an axis extending perpendicular to the grating plane.

By means of the objective, the image of the grating can be formed on the object. Instead thereof or in addition thereto it is possible to arrange the grating directly at the object or in the vicinity of the object and to project the shadow of the grating onto the object by means of a light source.

In a method of the kind mentioned hereinbefore, the problem underlying the present invention is solved according to a further proposal for which protection by an independent patent is claimed by the fact that the object is irradiated through a first projection grating by light of a first color and that the object is irradiated by light of a second color through a second projection grating which is turned through a certain angle with respect to the first projection grating, that the light reflected from the object is received by two sensors or by one sensor (color sensor) sensitive to said two colors, that the signals (shots or pictures) of the sensor(s) are evaluated and that the absolute coordinates of the object are ascertained on the basis of said evaluations. A rotation of the grating (or of the sensor) is unnecessary, as two gratings of different color, which form a certain angle with respect to each other, are projected onto the object. Consequently, the rotation of the grating is replaced by two gratings which can be evaluated separately. Images of the projected gratings are formed on a color-sensitive sensor, e.g. a color video camera. Therein they can be evaluated individually. The colors of the gratings may correspond to the sensitivities of the color sensor (red, green, blue). The sensors function in a color-selective manner, respectively, i.e. the images are separated in the respective colors by color filters or mosaic color filters.

Advantageous further developments of the present invention are described in the dependent claims.

The evaluation is preferably carried out according to the following formula $$I(r, phi) = f(a, b, g, \alpha)$$

wherein $I$ = intensity (luminous density, i.e. radiant intensity per unit area) at one point (pixel) of the sensor, $r$ = radius, i.e. spacing between a point at the projection grating (grating point) and a reference point of the projection grating, wherein said reference point preferably is the center of rotation of the projection grating, $phi$ = angle of rotation of the projection grating between the first and the second evaluation, or angle between the two (colored) gratings, $a$ = background brightness $b$ = contrast $g$ = grating constant of the projection grating $\alpha$ = phase constant.

The point being sought in the projection grating (grating point) can be indicated by polar coordinates $(r, phi_o)$, wherein $phi_o$ is the angle formed between the point on the projection grating (grating point) and a reference line. Then the intensity distribution (luminous density distribution) I of a linear, preferably sinusoidal grating with the grating period g is obtained by the formula stated above. The intensity I is measured by the sensor. It is dependent on the grating point with the polar coordinates $r$, $phi_o$ in the manner defined by the above formula. The intensity measured by the sensor corresponds to the luminous density of the pertaining object point. Since two shots or pictures are taken at different grating angles, two equations according to the above indicated formula are available for the evaluation. On the basis thereof, the two unknown quantities r and phi$_o$ can be determined. And therefrom, in turn, according to the method of triangulation, the absolute coordinate of the pertaining object point is obtained.

The quantity b/a is also referred to as modulation of the grating.

The luminous density I is mapped on the object and therefrom is projected for image-formation onto the sensor. When phi is changed by the rotation of the projection grating, also the intensity is changed at the pertaining pixel of the sensor. Since several, at least two, images are read in which differ from each other by the angle position phi of the grating, said intensity change allows to determine r and sin (phi - phi$_o$) and consequently also phi$_o$. And therewith, in turn, the triangulation for the determination of the object point can be performed.

It is also possible to turn the projection grating several times, i.e. to carry out sensor image-taking at more than two angles. When a color camera is used, preferably three images are evaluated in correspondence with the sensitivities red, green, blue of the color sensor. Consequently, during the measurement also several angles phi$_i$ can be set in order to increase the accuracy, and a phase shift evaluation (or any other one of the above described evaluations) can be carried out. Basically, two measurements (i=2) are sufficient for two different grating angles, since only two quantities, i.e. r and phi$_o$ are required for ascertaining the absolute coordinates of the object point. However, for increasing the accuracy several measurements can be performed. In the end, for each object point detected by the sensor, the absolute coordinates of the object point are stated independently for each sensor point (pixel).

Preferably, the evaluations are carried out according to the phase shift method. But it is also possible to perform the evaluations according to a Fourier transformation. The evaluations may also be carried out with phase-displaced images which are read in simultaneously (this is known per se from the German patent specification 38 43 396 to which reference is made).

In an apparatus of the kind mentioned hereinbefore, the problem underlying the invention is solved by the fact that the projection grating and/or the sensor can be rotated, i.e. can be brought into different angle positions, and that an evaluation unit is provided which evaluates the shots or pictures of the sensor with at least two different angle positions of the projection grating or the sensor and which determines therefrom the absolute coordinates of the object.

Preferably, the projection grating (and not the sensor) can be rotated, since a turnability of the projection grating can be realised with less expenditure, in particular with less mechanical expenditure than a turnability of the sensor.

According to a further proposal for which the protection by an independent patent is claimed, the problem underlying the invention is solved in an apparatus of the kind mentioned hereinbefore by a first projection grating for light of a first color, a second projection grating for light of a second color which is turned through a certain angle with respect to the first projection grating, two sensors or one sensor being sensitive to said two colors, and an evaluation unit evaluating the signals (shots or pictures) of the sensor(s) and determining the absolute coordinates of the objects on the basis thereof. Consequently, instead of a single grating for which the possibility to be rotated must be given, (at least) two projection gratings are used which are located at a certain angle with respect to each other and which can be evaluated separately by the sensor.

Advantageous further developments of the invention are described in the dependent claims.

The evaluations are preferably carried out according to the above explained formula.

The evaluations can be carried out according to a phase shift method. But they can also be performed according to a Fourier transformation. Furthermore, the evaluations can be carried out with phase-shifted images which are read in simultaneously (which is described in the German patent specification 38 43 396 to which reference is made).

A further advantageous development is characterized by a reference grating through which the light reflected from the object is projected onto the sensor. Said reference grating increases the achievable resolution. The reference grating is preferably constituted by the sensor itself. When the sensor—as for instance a CCD sensor—is constructed in lines, by said linewise structure the sensor simultaneously forms a reference grating. The reference grating and the sensor are thus realised by one and the same component in an especially simple manner.

It is preferred that the main planes of the objectives (projection objective and objective for the sensor) lie in the same plane; consequently, the main planes of the objectives are preferably arranged in alignment with each other. Therefrom the advantage is obtained that the Moiré areas constitute planes. Thereby the determination (computation) of the absolute coordinates is simplified. The visual impression of the resulting images corresponds to the one of (topographical) contour lines and is unambiguous.

It is advantageous that the focal length of the objectives are equal in size. This is particularly advantageous when the main planes of the objectives lie in the same plane. The determination (computation) of the absolute coordinates is further simplified by focal lengths of equal size.

The projection grating may have a sinusoidal or ramp-like transparency. But also other projection grating transparencies are possible, for instance rectangular or triangular ones or any other transparencies.

According to another advantageous further development the grating constant and/or the transparency of the projection grating can be adjusted and/or rotated. In this case, the rotation of the projection grating is not carried out by mechanical rotation of the grating, but by means of adjustable masks, for instance computer-controlled LCD (liquid cristal display) masks, and the grating constant, the intensity characteristics and the grating orientation thereof can be set in a random and simple manner. Accordingly, the projection grating is preferably constituted by an LCD display.

By the invention a method and an apparatus for ascertaining the absolute coordinates (absolute measurement) of the three-dimensional form of objects (bodies) by means of the Moiré technique or with lines projected thereon are created. For ascertaining the absolute coordinates the principle of triangulation is used. Therefrom the advantage results that only the projection grating and not the object or the image-forming optical system (as in the past) must be displaced mechanically, which can be realized with a very low mechanical expenditure and in a very precise manner. The projection grating has a relatively small mass compared with the image-forming optical system and the object the image of which is to be formed. When the optical system or the object are moved, due to the relatively large masses deflections occur which is avoided by the invention. When a color sensor is used for the operation, there are no mechanical and movable parts at all. There are also no mechanical and movable parts when a projection grating is used for the operation the grating constant or transparency of which can be adjusted e.g. with an LCD display.

BRIEF DESCRIPTION OF THE DRAWING

One embodiment of the invention is explained in detail in the following by means of the enclosed drawing, wherein the single FIGURE illustrates an apparatus for ascertaining the absolute coordinates of an object in a diagrammatic view.

DETAILED DESCRIPTION OF THE PREFERRED EMBODIMENTS

The light source 6 radiates white light which is concentrated by capacitor 11 and which is directed through the projection grating 2. The projection grating 2 is projected through the projection objective 7 onto the object 1 or onto the surface thereof for forming an image. The main plane 10 of the objective 7 extends in parallel to the plane of the grating 2 with a spacing d2.

The light 4 reflected from the object 1 is directed through the objective 8 onto the sensor 5. A reference grating 9 can but need not be inserted. In the drawing, the main plane 10' of the objective 8 lies in the same plane as the main plane 10 of the projection objective 7, which is not necessary on principle, but can be of advantage. The reference grating 9 extends in parallel to the main plane 10' of the objective 8, with a spacing d1 being of the same magnitude as the spacing d2. In the direction of radiation directly behind the reference grating 9 the sensor 5 is arranged. Because of simplicity reasons, in the drawing of the single FIGURE a spacing between the sensor 5 and the reference grating 9 is shown, which, however, is not given in the practical realisation. Furthermore, in the actual structure a CCD sensor is used with its pixels being arranged in lines so that said CCD sensor 5 simultaneously constitutes the reference grating 9. The grating lines of the reference grating 9 extend in parallel to the plane of projection of the single figure. In the initial position, i.e. in the unrotated position, also the grating lines of the projection grating 2 extend perpendicular to the plane of projection. Hence, in said initial position the grating lines of the projection grating 2 are parallel to the grating lines of the reference grating 9.

In the drawing, the optical axes of the projection objective 7 and objective 8 extend in parallel to each other and spaced apart from each other by a spacing b. The parallelism is not necessary but can be of advantage. The focal lengths of the objectives 7, 8 are of the same size. The gratings 2, 9 lie in the range of the depth of field (focal depth range) of the objectives 7, 8.

The projection grating 2 can be rotated about the optical axis 12 of the projection objective.

From each point of the projection grating 2 a ray 3 is directed through the center K2 of the projection objective 7 to object point 0. From said object point 0 the ray 4 passes through center K1 of the objective 8 onto a certain point (pixel) of the sensor 5. For the evaluation according to the principle of triangulation, the triangle K1, K2, 0 is observed. The basis b of said triangle is known from the given geometrical structure of the optics. The centers K1, K2 of the objectives 8, 7 are arranged at a distance b from each other. For all points in the range of the depth of field of the two objectives 7, 8, the individual pixels (picture elements) of the sensor (CCD sensor) 5 together with their spacings d1 (which in the arrangement shown in the single figure are of equal size for all pixels, since the reference grating 9 and the CCD sensor 5 extend in parallel to the main plane 10' of the objective 8) define a set of (spatial) angles to the optical axis 13 of the objective 8 with which the surface elements of the object 1 are projected on the sensor 5. Thereby also the angle at which a surface element of the surface of the object 1 appears from the center K1 of the objective 8 is given or known.

Consequently, for completely ascertaining the triangle K1, K2, 0, the pertaining point on the projection grating 2 and the pertaining angle for said point (grating point) must be determined on the projection grating 2. Thus, ascertaining the absolute coordinates of point 0 on the surface of the object 1 is possible.

Each surface element of object 1 is illuminated through the projection objective 7 from a point of the projection grating 2. When said location on the projection grating 2, pertaining to the surface point 0, is known, by the distance d2 of the projection grating 2 from the main plane 10 of the projection objective 7 the angle of the ray 3 to the optical axis 12 of the projection objective 7 is obtained. Thereby the triangulation computation for the determination of the triangle K1, K2, 0 can be carried out.

For the determination of said location on the projection grating 2, said projection grating 2 is rotated about the axis 12 which corresponds to the optical axis of the projection objective 7. The rotation of the projection grating 2 can be carried out through mechanical rotation of the projection grating 2 or via adjustable masks, e.g. computer-controlled LCD masks (liquid cristal displays), the grating constant, intensity characteristic and grating orientation of which can be randomly adjusted.

When the location on the projection grating plane (plane of the projection grating 2) is given in polar coordinates r, $phi_o$, the luminous density distribution (intensity distribution) I of a linear and preferably sinusoidal projection grating 2 of the period g is obtained according to the above-mentioned formula:

$$I(r, phi) = a + b \cos\left(\frac{2\pi r}{g} \cdot \sin(phi - phi_o) + \alpha\right)$$

The meaning of the individual formula letters has already been described above, and reference is made to said definitions.

Said luminous density I is projected onto the object 1 and from the object to the sensor 5. When phi (angle formed between the projection grating 2 and its axis of rotation 12) is changed, also the intensity I at the pertaining pixel of the sensor 5 is changed. By reading in of several (at least two) images which differ from each other in the angle position phi of the projection grating 2, said intensity change also renders possible the determination of r and sin $(phi - phi_o)$ and thereby phio. On the basis thereof, in turn, the triangulation can be carried out, i.e. the entire determination of the triangle K1, K2, 0.

During measurement, several angles $phi_i$ can be set. At least two angles must be set in order to enable the performance of the triangulation, but it is also possible to set more than two angles in order to increase accuracy. For each angle phi an evaluation is carried out, for instance according to the phase shift method or according to a Fourier transformation or with phase-shifted images which are read in simultaneously (according to the German patent Specification 38 43 396). In the end, for each object location 0 detected by the camera, the absolute coordinates of the object points 0 are determined individually for each pixel.

A rotation of the projection grating 2 is not necessary, if at least two projection gratings with different colors are projected onto the object 1, said gratings forming an angle with each other and the projected gratings are projected onto a color-sensitive sensor, for instance a color video camera. In this case, the colors of said grating may correspond to the sensitivities of the color sensor (red, green, blue).

By rotating the projection grating, a triangulation computation can be carried out which allows the determination of the absolute coordinates of the object. By projecting gratings of different colors, which are shifted with respect to each other, and by a corresponding color-selective image formation and evaluation a mechanical rotation of the grating becomes unnecessary.

By a rotation of the sensor about an axis extending perpendicular to the sensor surface, an improvement of the resolution below 1 pixel can be obtained.

We claim:

1. A method for ascertaining the absolute coordinates of an object wherein the object is irradiated with light through a projection grating, wherein the light reflected from the object is received by a sensor, and wherein the signal from the sensor is evaluated, comprising the steps of positioning first the projection grating and the sensor to provide a first image-formation, evaluating said first image formation, rotating the projection grating and the sensor relative to each other through a predetermined angle to provide a second image-formation, evaluating said second image formulation, and establishing the absolute coordinates of the object through said evaluations.

2. A method according to claim 1, wherein the projection grating is rotated through a predetermined angle.

3. A method according to claim 1 comprising the further step of evaluating said first and second image formation according to the formula $$I(r, phi) = a + b \cos\left(\frac{2\pi r}{g} \cdot \sin(phi - phi_o) + \alpha\right)$$

wherein

I = intensity at one point of the sensor,
r = radius, i.e., spacing of the point at the projection grating from a reference point of the projection grating, preferably of the point of rotation of the projection grating,
phi = angle of rotation of the projection grating between the first and the second evaluation.

$phi_o$ = angle of the point at the projection grating to a reference line,
a = background brightness
b = contrast
g = grating constant of the projection grating
$\alpha$ = phase constant.

4. A method according to claim 1 wherein the evaluations are carried out according to a phase shift method.

5. A method according to claim 1 wherein the evaluations are carried out according to a Fourier transformation.

6. A method according to claim 1 wherein the evaluations are carried out with images displaced in phase which are read in simultaneously.

7. A method for ascertaining the absolute coordinates of an object, wherein the object is irradiated with light through a projection grating, wherein the light reflected from the object is received by a sensor and wherein the signal from the sensor is evaluated, comprising the steps of irradiating the object with light of a first color through a first projection grating, irradiating the object with light of a second color through a second projection grating rotating the second projection grating through a predetermined angle with respect to the first projection grating, receiving the light reflected from the object is received by sensor means sensitive to said two colors, evaluating the signals from the sensor means, and ascertaining the absolute coordinates of the object on the basis of said evaluations.

8. A method according to claim 7 comprising the further steps of evaluation said sensor means signals according to the formula $$I(r, phi) = a + b \cos\left(\frac{2\pi r}{g} \cdot \sin(phi - phi_o) + \alpha\right)$$

wherein

I = intensity at one point of the sensor
r = radius, i.e., spacing of the point at the projection grating from a reference point of the projection grating preferably of the point of rotation of the projection grating
phi = angle of rotation of the projection grating between the sensor means signals evaluation
$phi_o$ = angle of the point at the projection grating to a reference line
a = background brightness
b = contrast
g = grating constant of the projection grating
$\alpha$ = phase constant 9. A method according to claim 7 wherein the evaluations are carried out according to a phase shift method.

10. A method according to claim 7 wherein the evaluations are carried out according to a Fourier transformation.

11. A method according to claim 7 wherein the evaluations are carried out with images displaced in phase which are read in simultaneously.

12. An apparatus for ascertaining the absolute coordinates of an object comprising
a light source, a projection optics, in particular a projection objective, a projection grating an image of which is formed on the object by means of the projection optics, a sensor for receiving the light reflected from the object and for generating a signal in response thereto, and an object which projects the light reflected from the object to form an image on the sensor, wherein the projection grating and the sensor can be rotated relative to each other, and an evaluation unit to evaluate the sensor signal at the least two different rotation angle positions of the projection grating and the sensor and which determines the absolute coordinates of the object therefrom.

13. An apparatus according to claim 12, wherein the projection grating can be rotated.

14. An apparatus for ascertaining the absolute coordinates of an object comprising, a light source, projection optics, including, a projection objective, a projection grating, an image of which is formed on the object by means of the projection optics, a sensor for receiving the light reflected from the object, and an objective which projects the light reflected from the object to form an image on the sensor, a first projection grating for light of a first color, a second projection grating for light of a second color, which is rotated through a certain angle relative to the first projection grating, sensor means sensitive to said two colors for producing signal in response thereto, and an evaluation unit for evaluating the sensor means signal and determining therefrom the absolute coordinates of the object.

15. Apparatus according to claim 14 wherein the evaluations are carried out according to the formula $$I(r, phi) = a + b \cos\left(\frac{2\pi r}{g} \cdot \sin(phi - phi_o) + \alpha\right)$$

and derivatives of said formula derived therefrom.

16. An apparatus according to claim 12 or 14 wherein the evaluations are carried out according to the formula $$I(r, phi) = a + b \cos\left(\frac{2\pi r}{g} \cdot \sin(phi - phi_o) + \alpha\right)$$

and derivatives of said formula derived therefrom.

17. An apparatus according to claim 12 or claim 14 wherein the evaluations are performed according to a phase shift method.

18. An apparatus according to claim 12 or claim 14 wherein the evaluations are performed according to a Fourier transformation.

19. An apparatus according to claim 12 or claim 14 wherein the evaluations are carried out with phase-shifted images which are read in simultaneously.

20. An apparatus according to claim 12 or claim 14 further comprising a reference grating through which the light reflected from the object is projected onto the sensor to form an image.

21. An apparatus according to claim 20, wherein the reference grating formed by the sensor, further comprises a CCD sensor.

22. An apparatus according to claim 12 or claim 14 wherein the main planes of the objectives lie in the same plane.

23. An apparatus according to claim 12 or claim 14 wherein the focal lengths of the objectives are of the same size.

24. An apparatus according to claim 12 or claim 14 wherein the projection grating is provided with a sinusoidal or ramp-like transparency.

25. An apparatus according to claim 12 or claim 14 wherein the grating constant and the transparency of the projection grating can be adjusted and rotated.

26. An apparatus according to claim 12 or claim 14 wherein the projection grating further comprises an LCD display.

* * * * *